United States Patent
Goldberg

(10) Patent No.: US 7,035,656 B2
(45) Date of Patent: Apr. 25, 2006

(54) METHOD AND SYSTEM FOR EFFICIENT DATA TRANSMISSION IN WIRELESS COMMUNICATION SYSTEMS

(75) Inventor: Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/322,165

(22) Filed: Dec. 18, 2002

(65) Prior Publication Data

US 2003/0208366 A1 Nov. 6, 2003

Related U.S. Application Data

(60) Provisional application No. 60/377,035, filed on May 1, 2002.

(51) Int. Cl.
*H04B 7/00* (2006.01)
*H04Q 7/20* (2006.01)

(52) U.S. Cl. .............. 455/517; 455/414.4; 455/412.2; 455/412.1; 455/3.02; 455/426.1; 370/352; 370/473; 370/521; 708/203; 709/247

(58) Field of Classification Search ............ 455/412.1, 455/412.2, 414.1, 414.3, 414.4, 458, 466, 455/517, 464, 455, 515, 516, 414.2, 67.16, 455/13.3, 72, 63.4, 426.1, 503, 3.02, 70; 340/7.1, 7.2, 7.21, 7.22, 7.24, 7.28, 7.29, 340/7.31, 7.35, 7.39, 7.41, 7.43, 7.45, 7.46, 340/7.48, 7.52, 7.53, 7.55, 7.56; 370/473, 370/352, 521, 329, 432, 477; 708/203; 709/247
See application file for complete search history.

(56) References Cited

U.S. PATENT DOCUMENTS

| 5,504,476 | A | * | 4/1996 | Marrs et al. ........... 340/825.44 |
| 5,621,660 | A | * | 4/1997 | Chaddha et al. ............ 709/247 |
| 5,850,526 | A | * | 12/1998 | Chou ......................... 709/247 |
| 5,894,480 | A | * | 4/1999 | Hoffert et al. .............. 370/389 |
| 5,929,848 | A | * | 7/1999 | Albukerk et al. .......... 715/700 |
| 6,085,069 | A | * | 7/2000 | Sharpe ...................... 455/31.3 |
| 6,094,146 | A | | 7/2000 | Sharpe |
| 6,683,870 | B1 | * | 1/2004 | Archer ........................ 370/356 |
| 2003/0043022 | A1 | * | 3/2003 | Burgan et al. ............. 340/7.21 |
| 2003/0063591 | A1 | * | 4/2003 | Leung et al. ................ 370/338 |

FOREIGN PATENT DOCUMENTS

GB 2360174 9/2001

* cited by examiner

*Primary Examiner*—Edan Orgad
*Assistant Examiner*—Shaima Q. Aminzay
(74) *Attorney, Agent, or Firm*—Volpe and Koenig, P.C.

(57) ABSTRACT

A network controller for controlling a message over a communication network constantly monitors actually transmitted message from or to a particular user. If the controller determines a particular phrase is transmitted more than a predetermined number of times, the controller updates support data and transmits the data in a compressed format with support data. The network controller may send an updated support data in response to a request from a user equipment. In this way, the present invention reduces the amount of traffic over the network.

10 Claims, 4 Drawing Sheets

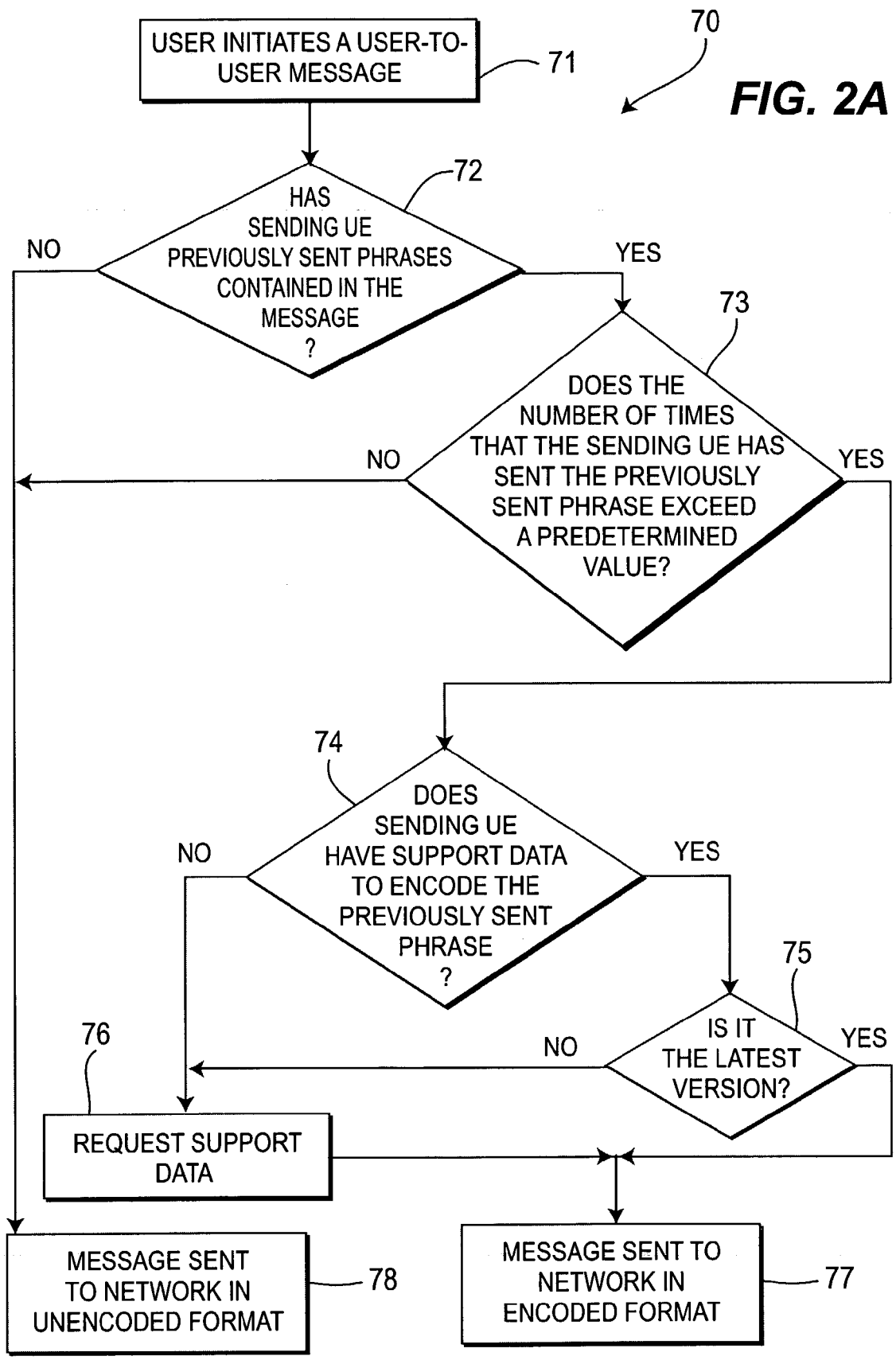

METHOD AND SYSTEM FOR EFFICIENT DATA TRANSMISSION IN WIRELESS COMMUNICATION SYSTEMS

CROSS REFERENCE TO RELATED APPLICATION

This application claims priority from U.S. Provisional Application No. 60/377,035 filed on May 1, 2002, which is incorporated by reference as if fully set forth.

BACKGROUND

The invention relates to wireless communication and more particularly to the efficient transmission of data over wireless communication networks.

In wireless communication systems and networks there are several well known problems such as high error rates, long latencies, battery limitations, and scarce channel resources. To address these problems, a well developed technique known as message compression is often used. Message compression seeks to reduce the overall amount of data that is transmitted while transmitting messages. By reducing the amount of data that needs to be sent, a greater amount of channel capacity is available for error detection and, where needed, data correction. Greater channel capacity also allows a greater amount of resources to be made available for other users. Furthermore, transmitting less data takes less time and results in less power being required to decode the transmitted data.

Unfortunately, prior art message compression techniques are often inefficient. For example, message compression is often accomplished by encoding a message and transmitting a dictionary along with the message so that a receiving user equipment (UE) may decode the data. The dictionary is typically sent along with a message each time a message is sent. This increases the overall amount of data being transmitted and is particularly problematic where the amount of data included in a dictionary is similar in size or larger than the message itself.

A similar problem exists with the transmission of short single phrase (i.e. canned) messages as well as with periodically transmitted data where not all of the data changes between periods. For example, with regard to short single phrase messages, such messages may be encoded so as to reduce the amount of data necessary to transmit the message. However, the data that is required for encoding a particular group of messages to which that message belongs is often transmitted along with the message thereby increasing the overall data requirement of the message. This is particularly problematic because the data relating to compression of the message, as mentioned, is often repeatedly sent to the same UE as similar messages are often repeatedly sent to a single UE.

With regard to data that is transmitted periodically, data that does not change between periods is often transmitted along with the data that has changed. This wastes valuable system resources transmitting data that did not need to be transmitted. By way of example, where the score of a sporting event is being periodically transmitted to a user, the names of the teams/individuals will not significantly change for the duration of the event. However, in prior art systems, not only is the score transmitted periodically, so are the names of the teams/individuals participating in the event. This results in transmission of data that otherwise did not change between periods thereby unnecessarily wasting system resources.

It would therefore be desirable to more efficiently transmit data in wireless communication networks.

SUMMARY

The invention is a method and system for efficiently transmitting data in wireless communication networks. Support data may be selectively provided to user equipment (UE) to reduce the amount of data transmitted over the network.

BRIEF DESCRIPTION OF THE DRAWING(S)

FIG. 2A is a method for efficiently transmitting data from users over a wireless communication network in accordance with an embodiment of the present invention.

DETAILED DESCRIPTION OF THE PREFERRED EMBODIMENT(S)

Figure 1:
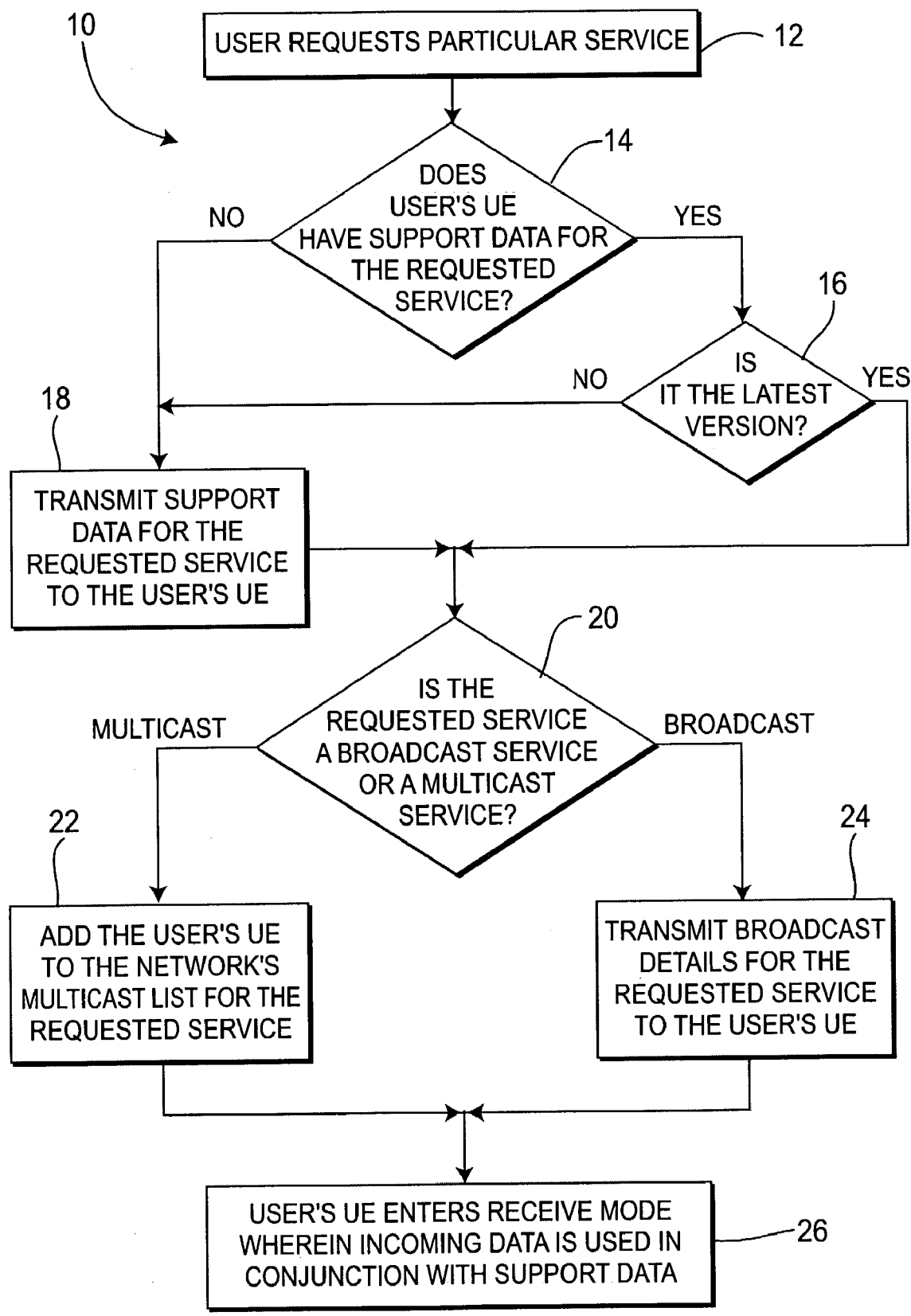
FIG. 1 is a method for efficiently transmitting data to users who subscribe to a particular service delivered to users over a wireless communication network in accordance with an embodiment of the present invention.

Referring initially to FIG. 1, there is shown a method 10 for efficiently transmitting data in a wireless communication network. It should be noted that the phrase "in a wireless communication network" is not meant to limit the applicability of the present invention and may be used interchangeably with the phrase "over a wireless communication network." In other words, the present invention may be implemented in any context involving the wireless transmission of data (i.e. messages) regardless of whether the actual origination or destination of the data is technically considered part of a particular wireless communication network. Furthermore, the present invention is equally applicable to messages transmitted in the uplink (UL) and messages transmitted in the downlink (DL). It should also be noted that the term wireless communication network may be used interchangeably with wireless communication system and that the term "phrase," as used herein, may not only include a word(s), but also numerical data. Additionally, the term transmitting and transmitted may mean sending, receiving, and both sending and receiving, as desired.

In a preferred embodiment, the method 10 may be used for transmitting data to users subscribing to a particular service which is delivered to users over a wireless communication network. The method 10 begins with step 12 wherein a user requests a particular service. The particular service requested by the user may be any type of service that may delivered to users over a wireless communication network. For example, the user may request a stock quote service whereby updated stock quotes are periodically transmitted to users continually providing them with the latest information concerning the price of a particular list of stocks. Other examples include sport score services, interest rate services, news alert services, or as mentioned, any other services available to wireless users. It is important to note, that users may request or otherwise sign-up for a particular service either over the wireless network or separately using any other methods established for requesting activation of a particular service.

In step 14, it is determined whether the user's user equipment (UE) has the necessary support data for the requested service. The support data may be any type of data related to the compression of data and typically will vary according to the type of service requested by the user. Examples of support data are data for compressing (i.e. decoding/encoding) single phrase (i.e. canned) messages, dictionaries for compressing multiple phrase messages, and templates for compressing messages having significant amounts of data that does not change between periodic transmissions of the messages. It should be noted that dictionaries may be used in place of templates, but templates are typically more efficient in the context of services that are periodically delivered over wireless networks.

Where a user has requested a sport score service, for example, the support data may be any type of support data, but preferably comprises templates relating to various combinations of sport teams/individuals that enable the network to transmit less data than if the UE did not have the template. For example, if the New York Yankees are playing the Boston Red Sox, the template for that game, say template 5, may be "Yankees X, Red Sox Y." The template enables the system to only send data that will change during the course of the game such as, for example, the score while refraining from sending data that will not change (i.e. the teams participating in the game). To update the score of the game, the network only has to transmit "template 5; 6,2" which the UE would translate and display to the user as Yankees 6, Red Sox 2. This example is quite simple and is made purely for purposes of explaining the concept of the invention. Of course, compression may be taken as far as desired to minimize the amount of data necessary to update a particular service. That is, continuing with the Yankees example, it is quite conceivable to further reduce "template 5; 6,2" to "5; 6,2." This allows considerably less resources to be allocated for transmitting this data to the various users who have requested the sport score service, as significantly less characters are repeatedly transmitted to what is typically quite a large number of users. Of course, other types of templates may be provided for other types of sporting events, or more generally, for any type of service involving periodically updated information that is transmitted over a wireless communication system.

If, in step 14, it is determined that the user's UE does have the support data, the method 10 proceeds to step 16. In step 16, the method 10 determines whether the UE has the latest version of the support data. If the UE does not have the latest version of the support data, the method 10 proceeds to step 18. Similarly, if the UE does not have the support data at all, the method 10 proceeds directly from step 14 to step 18. In step 18, the support data is transmitted to the user's UE. From step 16 (where the user's UE does have the latest version) or step 18, the method 10 proceeds to step 20 where it is determined whether the requested service is a broadcast service or a multicast service.

If the requested service is a broadcast service, the broadcast details for the requested service are transmitted to the UE in step 24. This enables the UE to wake up (if not already awake or otherwise ready for receipt of broadcast information) and receive data and information from the network at appropriate times. If the requested service is a multicast service, the UE is added to the network's multicast list of users who should receive messages related to the requested service (step 22). Regardless of whether the requested service is broadcast or multicast, once the UE is configured to receive messages related to the requested service, the method 10 proceeds to step 26. In step 26, the UE enters receive mode wherein incoming data is used in conjunction with support data to properly display incoming data.

It should be noted that although the method 10 is shown being performed at the time a user has requested a particular service, steps 14 through 26 may be performed repeatedly as desired according to how often a network operator would like to ensure that receiving UEs have the latest support data. Steps 14 through 26 may similarly be initiated and performed for particular groups of users any time new support data applicable to a particular group of users becomes available.

It is also important to note that while method 10 may, on a majority of occasions, be implemented in the downlink (DL) with the network providing data to subscribing users related to the service to which they subscribe, method 10 may also provide data reduction benefits in the uplink (UL). For example, users may wish to forward data provided by the network to other users. In which case, the data may be sent in the UL in the same encoded format that it was received by the UE. The network will recognize the encoded data and, if the target UE also has the support data, will simply forward the data to the target UE. If the target UE does not have the support data, the network may transmit the support data to the target UE. In situations where, say the user of the target UE is not a subscriber, the network may refrain from transmitting the support data and instead forward the data in an unencoded format. Of course, the principles described in other embodiments of the invention may be utilized in such situations to compress transmitted data despite the fact that the network operator may wish to refrain from transmitting a particular template to a non-subscriber.

Figure 2:
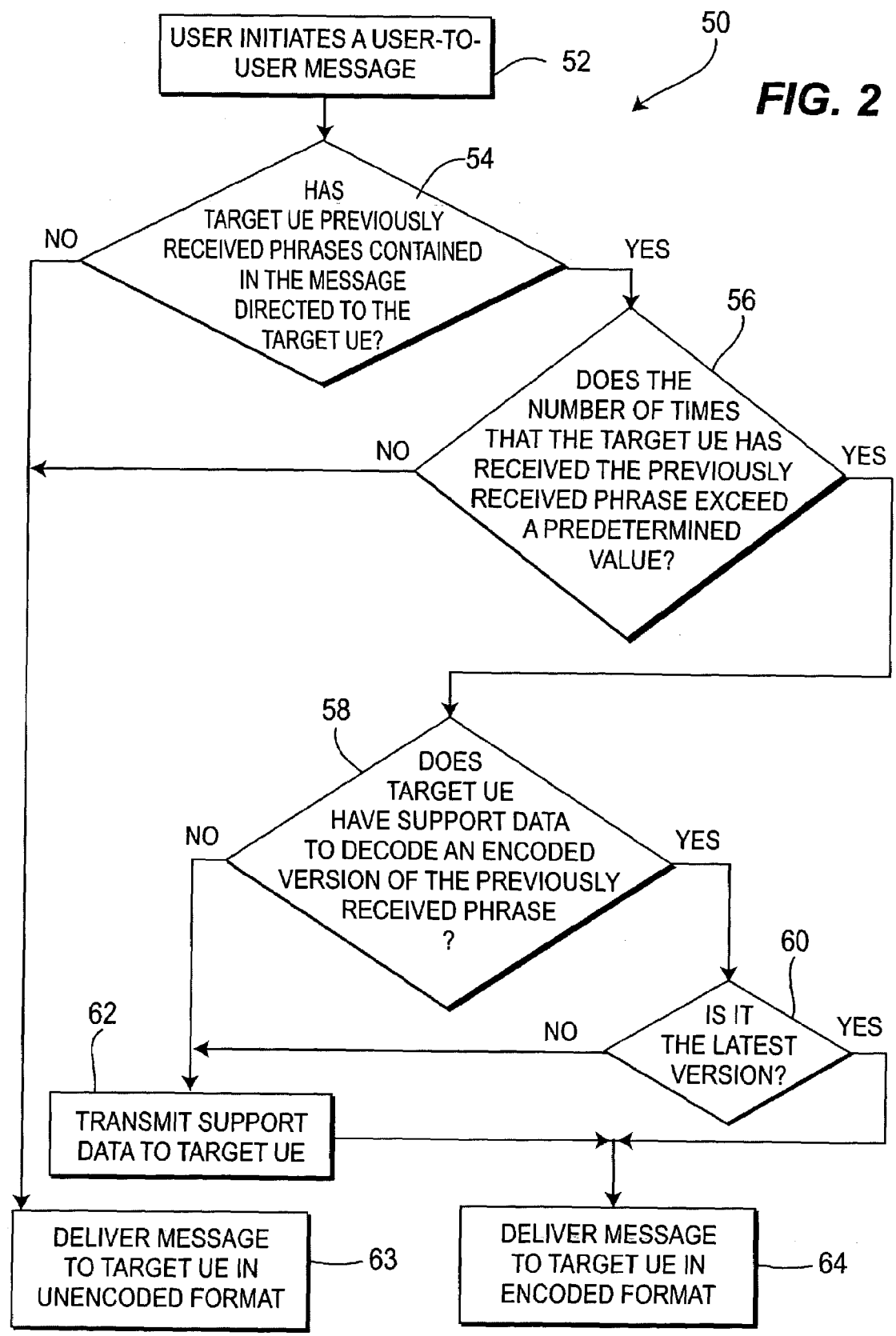
FIG. 2 is a method for efficiently transmitting data to users over a wireless communication network in accordance with an embodiment of the present invention.

Referring now to FIG. 2, there is shown a method 50 for efficiently transmitting data to users over a wireless communication network. The method 50 begins with step 52 where a user initiates a user-to-user message. User-to-user messages may be initiated in any manner, but are typically initiated by inputting a wireless telephone number of a target UE and executing the send key. When a user-to-user message is initiated, the method 50 proceeds to step 54. Step 54 is a decision point used to determine whether the target UE has previously received data (i.e. phrases, data related to the phrases or any other type of data) contained in the message directed to the target UE. It is important to note that monitoring of messages is not limited to data that has actually been received by the UE, and instead may include messages that have been sent to a target UE (i.e. composed and initiated for receipt by a particular UE). Also, for purposes of describing FIGS. 2–3, the type of data, purely by way of example, is phrases as contained in wireless messages.

Referring again to FIG. 2, if the target UE has not previously received any of the phrases contained in the message, the message is delivered to the user in step 63 in an unencoded (i.e. non-compressed) format. If the target UE has previously received any of the phrases contained in the message directed to the target UE, the method 50 proceeds to step 56. In step 56, it is determined whether the number of times that the target UE has received the previously received phrase(s), or any individual pieces thereof, exceeds a predetermined value. The predetermined value may be any value, as desired. A lower predetermined value will result in more aggressive delivery of support data. Support data is preferably strategically delivered so as to optimize network resources while refraining from overloading UE memory. This enables communication patterns to be evaluated so that particular forms of support data may be selectively provided, as appropriate, to particular UEs.

If, in step 56, the number of times that the target UE has received the previously received phrase(s) does not exceed the predetermined value, the message is delivered to the target UE in step 63 in an unencoded format. If the number of times that the target UE has received the previously received phrase(s) does exceed the predetermined value, the target UE is queried in step 58 to determine whether it has support data to decode an encoded version of the previously received phrase(s).

The support data, as with method 10, may be any type of data related to the compression of data being transmitted to a target UE. In this embodiment, however, support data is not service specific, but rather is more dynamic in that it may vary and evolve according to patterns of correspondence. Communications are monitored to identify communication patterns sent from particular UEs. Support data is then provided, as appropriate, to UEs that receive any of the identified communication patterns thereby reducing overall system resource requirements. For example, users receiving messages having data containing the phrase "I'll be late" or variations thereof, as part of single or multiple phrase messages, may be identified for receipt of support data for decoding an encoded form of "I'll be late." This allows future data messages containing the phrase "I'll be late" to be transmitted to those users with less data. For example, the phrase "I'll be late" may be encoded with a "1" thereby allowing future messages including the phrase "I'll be late" to be transmitted to the identified users by simply sending a "1." Similarly, multiple phrase messages including the phrase "I'll be late," may be transmitted with the encoded form of "I'll be late" along with the any other data, in unencoded form, included in the message. Because the receiving users have the support data, when they receive a message comprising a "1," the phrase "I'll be late" will be displayed. This reduces the amount of data transmitted in the DL.

As indicated, support data may also include dictionaries that relate tokens to strings of data that have been found to reoccur in messages. Using a dictionary allows a message to be transmitted by sending the tokens, any phrases not included in the dictionary, and the dictionary itself. For example, an electrical engineer may receive many messages wherein the words capacitor and resistor are repeatedly used. Transmitting the dictionary over and over again to these people is very inefficient, especially where the data stream is short compared with the dictionary. That is, using a dictionary allows tokens to be sent for items contained in the dictionary, but still requires transmitting the dictionary itself each time a message is sent. Pursuant to the present invention, messages are monitored and patterns of communication are identified. Therefore, in this example, once a user has received the words capacitor and resistor a sufficient number of times, a dictionary, say "electrical dictionary 1," may be sent to the user and stored on the user's UE so that future messages including "capacitor" and "resistor" may be transmitted in compressed format. There may be multiple dictionaries stored in a target UE, with the appropriate dictionary being selected by the message being transmitted. Further, if over time, the nature of the data to the target UE justifies adding or changing dictionaries in a UE, a new dictionary may be sent and, where necessary, a minimally used dictionary deleted.

As mentioned, support data may evolve according to the types of data being transmitted, as desired. For instance, particular users, in addition to receiving a sufficient amount of "I'll be late" phrases (i.e. enough to trigger receipt of support data for the "I'll be late" phrase) may also receive a sufficient amount of "I have to work" phrases either as a stand alone message or part of a larger message also comprising, for example, the "I'll be late" phrase. In such situations, the "I have to work" phrase may also be encoded. Where the phrase is received independent of the "I'll be late" phrase, the "I have to work" phrase may be assigned its own number, say "2." Where the "I have to work" phrase is received together with the "I'll be late" phrase, the combination "I'll be late. I have to work" phrase may be encoded with a number, say "3." When users who have received such support data are identified for future messages having data that includes the "I have to work" phrase, the network may simply transmit a "2." Similarly, when those users are identified for receipt of "I'll be late. I have to work," the network may simply transmit a "3." With this approach, custom dictionaries may, in effect, be built while creating support data for decoding messages received by particular users that include data having single phrases, or even multiple phrases.

As can be seen from the above example, there may be overlap between support data for single phrase messages and multiple phrase messages. In some circumstances, if enough support data is compiled for single phrase messages, a dictionary is in effect created. Overlap, however, between various types of support data is acceptable as message compression for user-to-user messages and broadcast/multicast services, regardless of the type of data contained therein (i.e. canned messages, multiple phrase messages, sport scores, etc.), may be accomplished using any type of support data, as desired. The determination of which type of support data to use is simply based on which type of support data provides the best result in light of the type of message, and the data therein, that is being compressed.

Returning again to step 58, if the target UE does have the support data, the method 50 proceeds to step 60. In step 60, it is determined whether the target UE has the latest version of the support data. If the target UE does not have the latest version of the support data, the method proceeds to step 62 where the support data is transmitted to the target UE. Similarly, if the user's UE does not have the support data at all, the method 50 proceeds directly from step 58 to step 62. From step 60 (where the target UE does have the latest version), or step 62 the method 50 proceeds to step 64 where the message is delivered to the target UE in compressed form. The target UE will use any received support data to decode any portions of a message which were sent in encoded format. Of course, data is only sent in compressed form where it may be properly decoded by the recipient.

As mentioned, the present invention may be used to not only reduce data on the DL, but also the UL. Referring now to FIG. 2A, another embodiment (i.e. method 70) is shown wherein data may be efficiently transmitted from users over a wireless communications network. The description of method 50 is applicable to method 70, in the context of message compression in the UL. Method 70, therefore, for the sake of brevity, will be described in less detail than method 50. It is important to note that methods 50 and 70 may be implemented independently or together so as to provide system benefits in both the DL and UL. Where methods 50 and 70 are implemented together, they may be implemented simultaneously, as desired. Method 50 is preferably performed at the network whereas method 70 is preferably performed at either the network or the UE. Of course, both methods 50, 70 may be implemented with a predetermined number of steps performed at the UE and a predetermined number of the steps performed at the network, as desired.

Method 70 begins with step 71 where a user initiates a user-to-user message. In step 72, it is determined whether the sending UE has previously sent phrases, or any other type of data, contained in the message. If not, the message is transmitted to the network (i.e. in the UL) in an unencoded (i.e. non-compressed) format in step 78. If the sending UE has previously sent any of the phrases contained in the message, the method proceeds to step 73. In step 73, it is determined whether the number of times that the sending UE has sent the previously sent phrase(s) exceeds a predetermined value, which may be any value as desired. If not, the message is transmitted to the network (i.e. in the UL) in unencoded format in step 78. If so, the method proceeds to step 74.

Step 74 is a decision point used to determine whether the sending UE has support data to encode the previously sent phrase(s). If the sending UE has the support data, the method 70 proceeds to step 75 to determine whether it is the latest version. If the sending UE does not have the latest version, the method 70 proceeds to step 76 where the sending UE requests the support data. The requested support data is preferably provided by the network, but may be loaded into the UE, as desired. If it is determined in step 74 that the sending UE does not have the support data at all, the method 70 proceeds directly from step 74 to step 76. From step 75 (where the sending UE does have the latest version), or step 76 the method proceeds to step 77 where the message is transmitted to the network in an encoded format.

If the message is directed to a target UE having the support data, the network will deliver the message as received from the sending UE (i.e. in compressed form). If the message is directed to a target UE that does not have the support data the network may, in accordance with method 50, decode it and deliver it in uncompressed form or deliver it in compressed form along with the support data.

Figure 3:
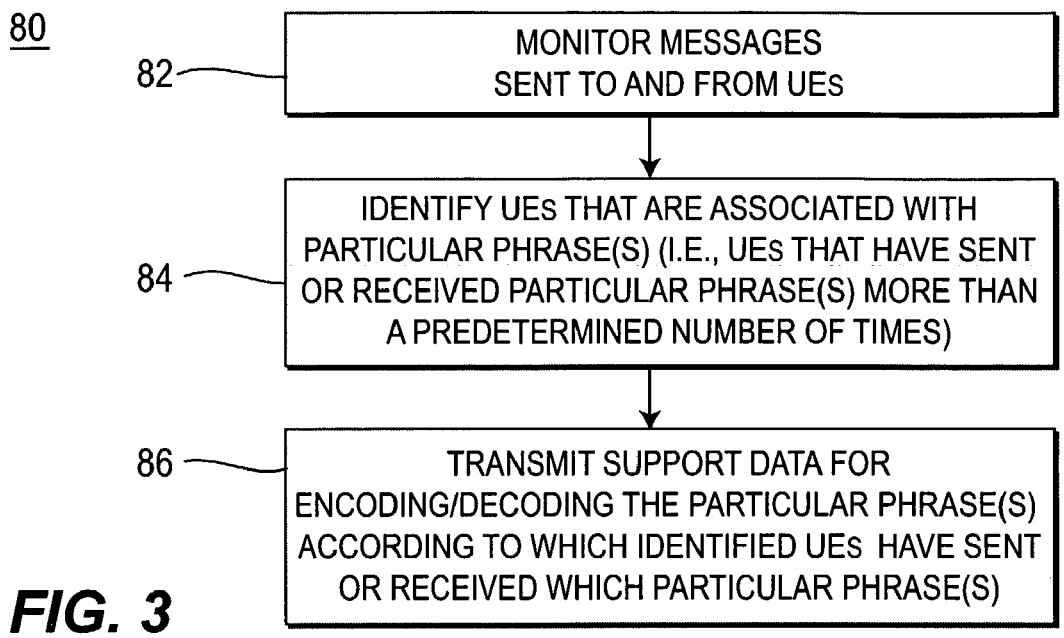
FIG. 3 is a method for efficient management of messages transmitted over a wireless communication network in accordance with an embodiment of the present invention.

Referring now to FIG. 3, there is shown a method 80 for efficient management of messages transmitted over a wireless communication network. The method 80 begins with step 82 by monitoring messages sent to and from UEs that utilize the network. This allows communication patterns to be identified so that support data may be delivered so as to minimize the amount of data transmitted over a wireless network. The messages may be user-to-user (both UL and DL) or network-to-user as in the case of various subscription services. Again, any type of data in any type of wireless message may be monitored for possible compression, such as for example, data messages having single phrase messages or multiple phrase messages. In step 84, the network identifies UEs who may be considered as being associated with particular types of data. That is, the network identifies UEs who have sent or received (or both) any particular phrase or phrases more than a predetermined number of times (i.e. UEs where particular phrase(s) have been included in more than a predetermined number of messages sent or received (or both) by the UEs). As mentioned, such UEs are considered as being associated with the particular phrase(s) that they have sent or received (or both) more than a predetermined number of times. The particular phrase(s) may be contained in previously created sets of support data or may be used to create new sets of support data, as desired. In step 86, support data for compressing the particular phrase(s) is selectively transmitted to the identified UEs so that future messages to and from the identified UEs that contain the particular phrase(s) may be transmitted in compressed form in so much as the messages contain the particular phrase(s). That is, support data may be transmitted to and from the identified UEs according to which identified UEs are associated with which particular phrase(s).

So as to provide an example, assume a 1000 UEs out of all the UEs using a particular wireless system are identified as having repeatedly received data including the phrase "I love you," and that, for purposes of this example, the phrase "I love you" is included in a previously created set of support data equating the phrase "I love you" with the number "1." Further assume that each of the UEs have received the phrase "I love you" a sufficient amount of times to trigger receipt of appropriate support data (i.e. the UEs are associated with the phrase "I love you"). In that case, support data is transmitted to each of the UEs so that when any of them are identified as the recipient of a message comprising the phrase "I love you," they will receive and be able to decode the number "1," which the UEs will display as "I love you."

To provide another example, assume that a 1000 UEs out of all the UEs connected to a wireless network are identified as having repeatedly sent data including the phrase "I miss you," and that, for purposes of this example, the phrase "I miss you" is not included in any previously created set of support data. In this case, again assuming that receipt of support data has been triggered (i.e. the UEs are associated with the phrase "I miss you"), support data may be created and transmitted to each of the UEs so that in the future if any of them initiate a message containing the phrase "I miss you," the phrase will be transmitted in a compressed format. Whether the message is ultimately delivered to a target UE in the compressed format depends on whether appropriate previously or newly created support data exists at the target UE. It is important to note that newly created support data (which may be created where particular phrases not included in previously created support data are identified as being sent to or from particular UEs) may be created in real time, as desired.

Figure 4:
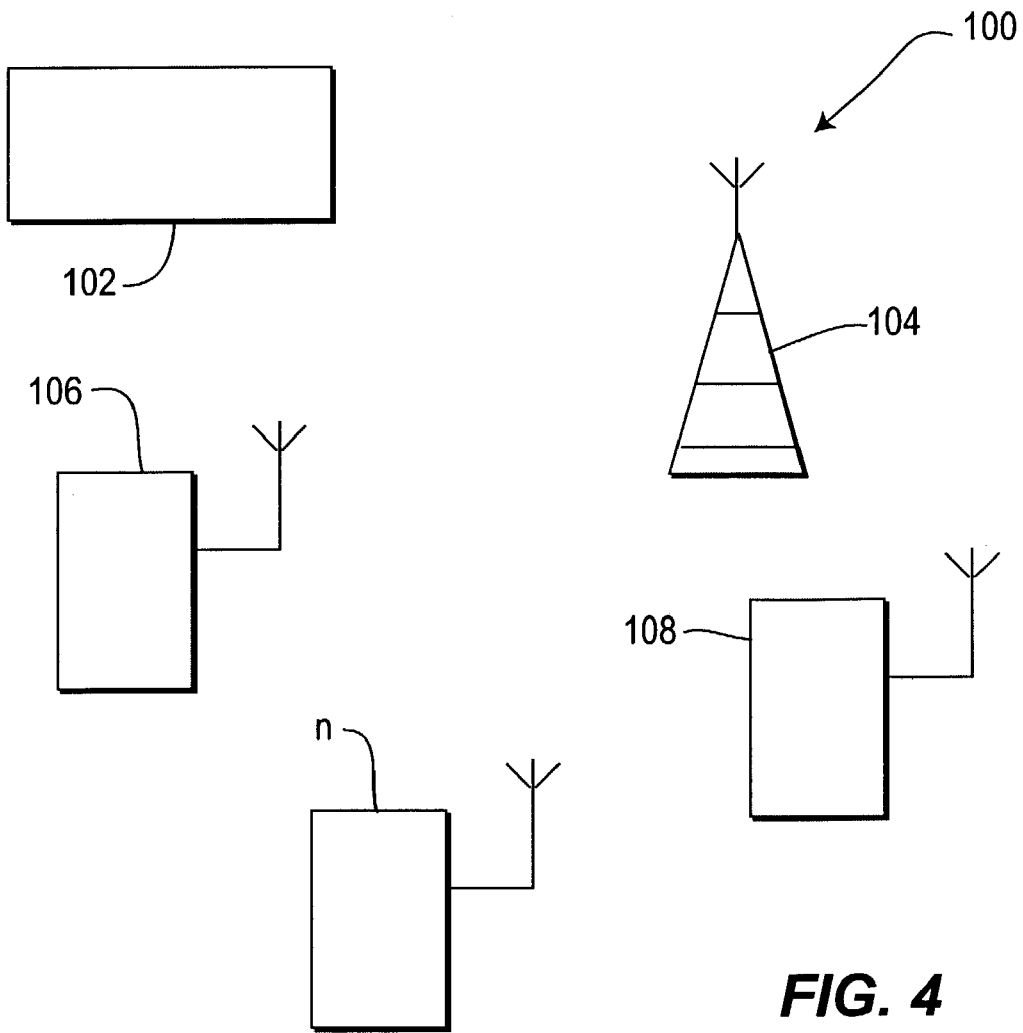
FIG. 4 is a wireless communication system for efficiently transmitting data in accordance with an embodiment of the present invention.

Referring now to FIG. 4, there is shown a wireless communication system 100 for efficiently transmitting data. The system 100 comprises at least one radio network controller (RNC) 102, at least one base station (BS) 104, and a plurality of user equipments (UEs) 106, 108 . . . n. Although not shown for simplicity, the RNC is typically hardwired to the base station(s) 104, as understood by those skilled in the art. In a first embodiment, a user, say UE 106, subscribes to a particular service delivered over the system 100. As mentioned, the service may be any type of service delivered over a wireless communication system such as a sport score service, stock quote service, news alert service, etc. In this situation, support data is preferably provided in the form of templates wherein a particular template or a plurality of templates may be associated with each available service. For example, if the user having UE 106 subscribes to a sport score service, support data for the sport score service will be transmitted to UE 106, preferably before the UE begins receiving the sport score service. Of course, additional support data may also be transmitted to UE 106 for particular sporting events as they are requested by the user.

This approach takes advantage of the fact that quite often the bulk of a message remains constant, with only pieces here and there changing over time. Continuing with the example of a sport score service, the names may be the same most of the time, with only some of the numbers changing.

Once the UE 106 receives the support data, which as mentioned is preferably a template or set of templates, future messages will identify only the positions within the template that have changed, while the other positions retain the last data received. A variation on this approach is to sequentially transmit each position in the template with either new data or a last-received-still-valid indication. Other variations are possible as well, and the approach that is most efficient is dependant on the data being transmitted and the propensity of each item to change over time. Of course, other forms of support data may also be used as appropriate.

The distribution of the support data may be controlled at the RNC 102. The RNC 102 may monitor messages delivered to the UEs who subscribe to a particular service and ensure that those UEs have the latest support data for that service. The RNC 102 will optimize delivery of support data to ensure the least amount of data is being transmitted to subscribing users. The RNC 102 may also modify, add, or delete support data from particular users, as needed. For example, say UE 106 drops the sport score service and adds a stock quote service, the RNC 102 may delete the support data for the sport score service from UE 106 and add the support data for the stock quote service to UE 106. Where a request for service is made over the wireless system 100, UE 106 may be adapted to inform the system whether it has support data corresponding to the service being requested. This eliminates the need to query UEs for whether they have the latest support data.

In another embodiment, users may send user-to-user messages whereby the system 100 monitors the messages to identify transmitted data that includes, for example, communication patterns or repeating phrases sent to and from particular users. Where a sufficient number of repeating phrases are detected as being delivered to particular users, for example, the system 100 may transmit support data to the UEs belonging to those users. Similarly, where a sufficient number of repeating phrases are detected as being sent from particular users, the system 100 may transmit support data to the UEs belonging to those users. The support data will reduce the amount of data required to transmit such phrases in the UL and DL in the future.

By way of example, UE 106 may send periodic messages to UE 108 wherein the messages have a typical content. The content may be, for example, of a personal nature, financial nature, engineering nature etc. The system 100 may detect such types of messages being delivered to UE 108 and transmit a particular dictionary to UE 108 depending on the detected content of the messages received by UE 108. For example, where UE 108 is used by an investment banker, messages sent and received by UE 108 are likely to include messages of a financial nature. Once a sufficient number of financial terms or phrases are sent or received by UE 108, the system 100 may transmit a financial dictionary to UE 108. This will enable subsequent messages that contain phrases for which there are tokens in the financial dictionary to be transmitted by simply transmitting (in the DL and UL) the tokens as well as any phrases not included in the financial dictionary. The system 100 may similarly transmit support data for single phrase messages as previously explained.

The RNC 102 may again be used to monitor messages and control the distribution of support data based on communication patterns identified, in general, or with respect to particular users. For example, the RNC 102 may notice that certain phrases are repeatedly used (i.e. sent to or from or both) by users in a particular geographical area. In that case, the system 100 may transmit support data for compressing that data (i.e. the repeatedly used phrases) to all of the users in that geographical area. This will allow the repeatedly used phrases to be transmitted in a compressed format. Similarly, the RNC 102 may notice that a certain phrase or phrases are repeatedly used by a particular individual user and send appropriate support data to that user, as described above. The examples provided above are purely for purposes of describing the invention, as message monitoring and support data distribution may be performed, as desired, so as to optimize system 100 resources.

It should be noted that "unencoded data" refers to data that is not encoded (i.e. compressed) pursuant to the teachings of the present invention as data that is not encoded as a result of the teachings of the present invention may nevertheless be transmitted in some other type of encoded form, as understood by those skilled in the art.

Although particular processing functions have been described as being performed by particular components, it should be understood that performance of processing functions may be distributed among network components as desired.

Although the present invention has been described in detail, it is to be understood that the invention is not limited thereto, and that various changes can be made therein without departing from the spirit and scope of the invention, which is defined by the attached claims.

What is claimed is:

1. A method for transmitting data to a group of user equipments (UEs) by multicasting or broadcasting over a wireless communication system comprising:
   monitoring actually transmitted messages multicast or broadcast to the group of UEs in a wireless communication system;
   generating a list of phrases in the messages that are sent repeatedly more than a predetermined threshold to the group of UEs;
   transmitting the list of phrases to the group of UEs;
   determining whether any particular phrases contained within new messages have been received by any of the UEs within the group of UEs;
   identifying the UEs that have received the particular phrases contained within the new messages a predetermined number of times;
   determining whether any of the identified UEs requires a latest version of support data for decoding compressed phrases;
   transmitting the latest version of support data to those identified UEs requiring said support data for decoding compressed phrases; and
   transmitting the phrases in the new messages to the identified UEs in a compressed format.

2. The method of claim 1 wherein the messages are user-to-user messages.

3. The method of claim 1 wherein the messages are monitored in the downlink.

4. The method of claim 1 wherein the messages are monitored in the uplink.

5. The method of claim 1 wherein the particular phrases are single phrase messages.

6. The method of claim 1 wherein the particular phrases are multiple phrase messages.

7. The method of claim 1 wherein the particular phrases are part of periodically sent data that is sent to users who subscribe to a service delivered over the wireless communication system.

8. The method of claim 7 wherein the particular phrases include numerical data.

9. A method for transmitting data by multicasting or broadcasting over a wireless communication system comprising:
- monitoring actually transmitted downlink messages multicast or broadcast to a group of user equipments (UEs);
- generating a list of phrases in the downlink messages that are sent repeatedly more than a predetermined threshold to the group of UEs and remain the same between periods; and
- transmitting as support data the list of phrases to the group of UEs that receive the downlink messages so that the downlink messages may be delivered to the UEs in a compressed format;
- determining whether any of the identified UES requires a latest version of support data for decoding compressed phrases: transmitting the latest version of support data to those identified UEs requiring said support data for decoding compressed phrases; and
- wherein the support data comprises templates that allow the system to refrain from retransmitting data that has not changed since the last time it was transmitted.

10. The method of claim 9 wherein the downlink messages are related to a service delivered over the network to users subscribing to the service.

* * * * *

UNITED STATES PATENT AND TRADEMARK OFFICE
CERTIFICATE OF CORRECTION

| | | |
|---|---|---|
| PATENT NO. | : 7,035,656 B2 | Page 1 of 1 |
| APPLICATION NO. | : 10/322165 | |
| DATED | : April 25, 2006 | |
| INVENTOR(S) | : Steven Jeffrey Goldberg | |

It is certified that error appears in the above-identified patent and that said Letters Patent is hereby corrected as shown below:

At column 2, line 60, after the word "may", insert --be--.

At claim 9, column 12, line 1, after the word "identified", delete "UES" and insert therefor --UEs--.

Signed and Sealed this

Fifth Day of December, 2006

JON W. DUDAS
*Director of the United States Patent and Trademark Office*